(12) United States Patent
Ross et al.

(10) Patent No.: US 6,668,285 B1
(45) Date of Patent: Dec. 23, 2003

(54) OBJECT ORIENTED PROCESSING WITH DEDICATED POINTER MEMORIES

(75) Inventors: Kevin Ross, Sunnyvale, CA (US); Winthrop L. Saville, Soquel, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/310,483

(22) Filed: May 12, 1999

(51) Int. Cl.[7] .................................................. G06F 9/54
(52) U.S. Cl. ........................................ 709/316; 711/221
(58) Field of Search ................................ 709/315, 316; 711/200–209, 221; 717/108, 116

(56) References Cited

U.S. PATENT DOCUMENTS

| 5,615,348 | A |   | 3/1997 | Koino et al. ............... 395/569 |
| 5,655,132 | A |   | 8/1997 | Watson ...................... 395/674 |
| 5,708,838 | A |   | 1/1998 | Robinson ................... 395/800 |
| 5,713,038 | A |   | 1/1998 | Motomura ................. 395/800 |
| 5,742,822 | A |   | 4/1998 | Motomura ................. 395/672 |
| 5,774,721 | A |   | 6/1998 | Robinson ................... 395/683 |
| 6,230,311 | B1 | * | 5/2001 | Gerard et al. .............. 717/108 |
| 6,393,491 | B1 | * | 5/2002 | Bracha et al. .............. 709/315 |
| 6,412,019 | B1 | * | 6/2002 | Gibbons et al. ............ 709/315 |
| 6,438,616 | B1 | * | 8/2002 | Callsen et al. ............. 709/316 |

FOREIGN PATENT DOCUMENTS

| EP | 0325384 A2 | 7/1989 | ........... G06F/15/00 |
| EP | 0511674 A2 | 11/1992 | ........... G06F/15/78 |
| WO | WO9532466 | 4/1995 | ............. G06F/9/30 |

* cited by examiner

Primary Examiner—St. John Courtenay, III

(57) ABSTRACT

Object oriented processing is performed by holding pointers to memory locations of object variables and method tables in dedicated registers. The pointers for current and previous operations of the processor are held in respective first and second groups of the dedicated registers. For each object, the respective object variables are stored at a memory location and the pointer to a respective method table is stored at a memory location indexed off of the location of the object variables.

23 Claims, 5 Drawing Sheets

OBJECT ORIENTED PROCESSING WITH DEDICATED POINTER MEMORIES

BACKGROUND OF THE INVENTION

1. Field of the Invention

The invention relates to object-oriented processing and, in particular, to the manipulation of object-related information.

2. Description of Related Art

In object-oriented processing, a processor manipulates information relating to objects. Some of the advantages and uses of such object-oriented processing are described in U.S. Pat. No. 5,708,838.

Each instance of an object has a set of object variables defining characteristics related to the object and methods which are supported by the object. For example, the set of object variables for a FIFO located in a RAM would typically include codes defining the FIFO's maximum size, its currently-occupied memory locations, the current memory location of its input, and the current memory location of its output. Methods typically supported by the FIFO object would include operations for performing typical FIFO functions, such as APPEND, REMOVE, FLUSH, INITIALIZE.

One of the disadvantages of employing object-oriented processing is that it typically requires the storage and processing of more instructions than does structure-oriented or data-flow-oriented processing. Thus, the greater versatility of object-oriented processing is achieved at the cost of providing additional code space and increasing the time needed to access the methods for performing the functions.

Typically, the methods supported by the objects manipulate the object variables, and parameters providing non-volatile information about the objects, in accordance with algorithms. Objects may contain references to other objects, may themselves be passed as parameters in the performance of methods, and may need to call methods of other objects. This can be a very time consuming aspect of object oriented processing.

SUMMARY OF THE INVENTION

It is an object of the invention to alleviate the above-mentioned disadvantages of employing object-oriented processing.

In accordance with the invention, a processor manipulates current and previous object variables, and current and previous method tables which list memory locations for methods associated with the current and previous object, in a manner which reduces both code space and accessing time. To achieve this, the processor:

- stores in memory at least one object variable for at least one of a plurality of objects;
- stores in memory at least one method table for the plurality of objects;
- provides a first dedicated memory for storing pointers locating in memory currently utilized ones of the at least one object variable and of the at least one method table;
- provides a second dedicated memory for storing pointers locating in memory previously utilized ones of the at least one object variable and of the at least one method table.

By utilizing dedicated memories containing their respective pointers, the processor inherently knows where the current and previous object variables and method tables are located. This permits the sizes of codes directed to the object variables and method tables to be minimized. By providing dedicated memories for both current and previous object variables and method tables, the processor can very quickly switch from a current object method to a previous object method.

Note that the word "memory", as used herein, is intended to be interpreted as generally as is consistent with the manner in which it is used and includes volatile and non-volatile devices of various types including, without limitation, RAMs, DRAMs, ROMs, registers and combinations of such deices. A "dedicated" memory means that the memory has one or more specific locations which are known to the processor. However, these locations need not be fixed, but may be changed under the control of the processor. Also, as used herein, the word "pointer" means any value that identifies a memory location. Additionally, "reading" means retrieving information from one memory and writing it into another.

DESCRIPTION OF THE PREFERRED EMBODIMENTS

Figure 1:
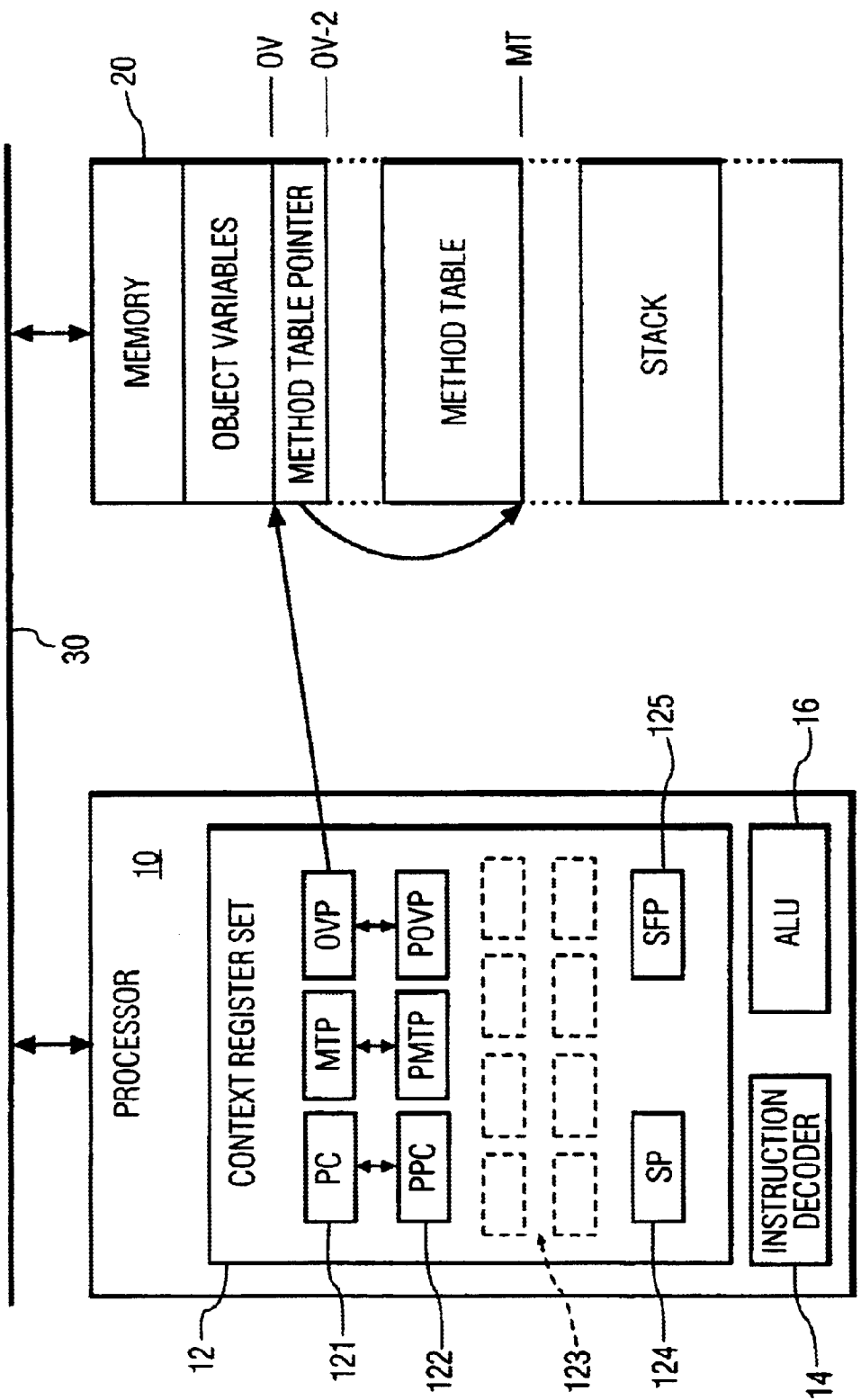
FIG. 1 is a block diagram illustrating parts of an object-oriented processing system structured in accordance with an embodiment of the invention.

The object-oriented processing system of FIG. 1 includes a processor 10 and a memory 20. The exemplary processor 10 is a hardware-accelerated unit which utilizes clock pulses to sequence through instructions identified by a program counter register. Typically, the program counter register contains the memory location of the next instruction to be read and acted upon by the processor.

The processor includes, inter alia, a context register set 12, an instruction decoder 14 and an arithmetic logic unit 16. The memory 20, in this exemplary embodiment, comprises a RAM having a multiplicity of memory locations for storing, inter alia, object variables, method table pointers, method tables and for serving as a LIFO stack for facilitating performance of the methods.

The processor 10 and the memory 20 are connected to a common bus 30 for communicating with each other and with other hardware that is connected to the bus. The bus includes respective lines for carrying information such as addresses, interrupts, data, read strobes, write strobes and device-select strobes. Preferably, this is a high-speed bus which is at least partially formed on a common silicon substrate with the processor and the memory.

The context register set 12 includes first and second groups of registers 121 and 122 for holding information relevant to current and previous operations of the processor, one or more general purpose registers 123, and two registers 124 and 125 that are utilized for addressing the stack. More specifically, the registers in the context register set include:

an Object Variables Pointer register OVP for holding a pointer identifying the location in memory of a set of variables for a current object;

a Previous Object Variables Pointer register POVP for holding a pointer identify the location in memory of a set of variables for a previous object;

a Method Table Pointer register MTP for holding a pointer identifying the location in memory of a method table for a current object;

a Previous Method Table Pointer register PMTP for holding a pointer identifying the location in memory of a method table for a previous object;

a continually-updated Program Counter register PC for holding the memory address of the next instruction to be acted upon by the processor;

a Previous Program Counter register PPC for holding the memory address of an unexecuted instruction previously held in the Program Counter register;

general purpose registers 123 for containing data which is either read from the memory 20 or produced by the arithmetic logic unit 16;

register 124 for holding a stack pointer SP identifying the location in memory of the current stack address being accessed;

register 125 for holding a stack frame pointer SFP identifying the location in memory of the base address of the bottom frame in the stack.

The instruction decoder 14 is a conventional hardware component, such as a sequencer or micro-sequencer, for converting instructions read from the memory 20 to lower-level operation codes to be executed by the arithmetic logic unit 16. The arithmetic logic unit is also a conventional hardware component.

Note that, for simplicity, the memory 20 shown in FIG. 1 illustrates only a single block of storage space for each of:

object variables for a specific instance of an object;

a method table pointer identifying the location in the memory of the method table for the specific instance of the object; and the method table located by the method table pointer.

In practice, there are typically a number of blocks of storage space for different object variables, for different method tables, for their respective pointers, and also for other information that is not shown in FIG. 1 (e.g. coding for the methods located by the method tables). The number of blocks of storage space depend primarily on the number of objects and the methods they support and whether any of the blocks are shared for storing information relating to more than one object. For example, the same method table may sometimes be utilized by a number of different objects of the same general type. For each instance of an object, however, the respective method table pointer is stored at predetermined locations, i.e. at locations which are determined sometime before they are accessed by the processor. One alternative is to store the pointer as part of an instruction which will be accessed by the processor. However, in a particularly advantageous embodiment of the invention, the method table pointer is stored at a memory location having a predetermined relation to the location of the associated object variables. In the exemplary embodiment shown in FIG. 1, each method table pointer is stored at a memory location having a base (starting) address equal to OV-2, i.e. at an address having a value that is 2 lower than a base address OV of the object variables. The block of memory for the method table has a base addresses of MT.

The processor 10 utilizes specific instructions for transferring object-related information between the first and second groups of registers 121 and 122 in the context register set and into and out of the stack. In this exemplary embodiment these instructions are named CALL, RETURN, ENTER[M], and LEAVE[N], which are generally described as follows:

The CALL instruction causes the processor to initiate the performance of a different method. This instruction has two different forms, i.e. a Local CALL and a Non-Local CALL:

The Local CALL causes the processor to initiate performance of a method addressed in a method table which is currently in use. This instruction causes the processor to read the contents of the registers PC, MTP, OVP into the registers PPC, PMTP, POVP, respectively, and to update the register PC with the address of the first instruction of a new current method to be performed.

The Non-Local CALL causes the processor to initiate performance of a method addressed in a method table which is not currently in use and for a different object than that of the current method table. This instruction does everything that the Local CALL does, but further causes the processor to update the registers MTP and OVP with a new method table pointer and a new object variables pointer, respectively.

The RETURN instruction causes the processor to initiate the return to performance of a previous method. This instruction causes the processor to read the contents of the registers PPC, PMTP, POVP into the registers PC, MTP, OVP, respectively.

The ENTER instruction causes the processor to decrement the value in register 124, i.e. the stack pointer SP, to an address which will provide sufficient storage space for storing local variables (i.e. variables associated with a method currently being performed). The space required is indicated by a value M, which forms part of the ENTER instruction. The processor then pushes the contents of the registers PPC, PMTP, POVP and 125 (the current stack frame pointer SFP) into the stack, decrements the value of the stack pointer SP (in register 124) to a value which provides the space indicated by the value M and the space occupied by the newly-pushed information, and reads the value from register 124 into register 125 as the new value of the stack frame pointer SFP.

The LEAVE instruction causes the processor to pop off of the stack the contents of the bottom frame. In particular, the bottom frame contains the last-pushed contents of the registers PPC, PMTP, POVP, and the value SFP', which the processor reads into the registers PC, MTP, OVP, and 125, respectively. In completing this instruction, the processor increments the stack pointer SP to the new base address of the stack. This is facilitated by a value N, included in the instruction, which represents whatever memory space in the bottom frame had been occupied by information (e.g. parameters and variables) that will not be saved.

Figure 2:
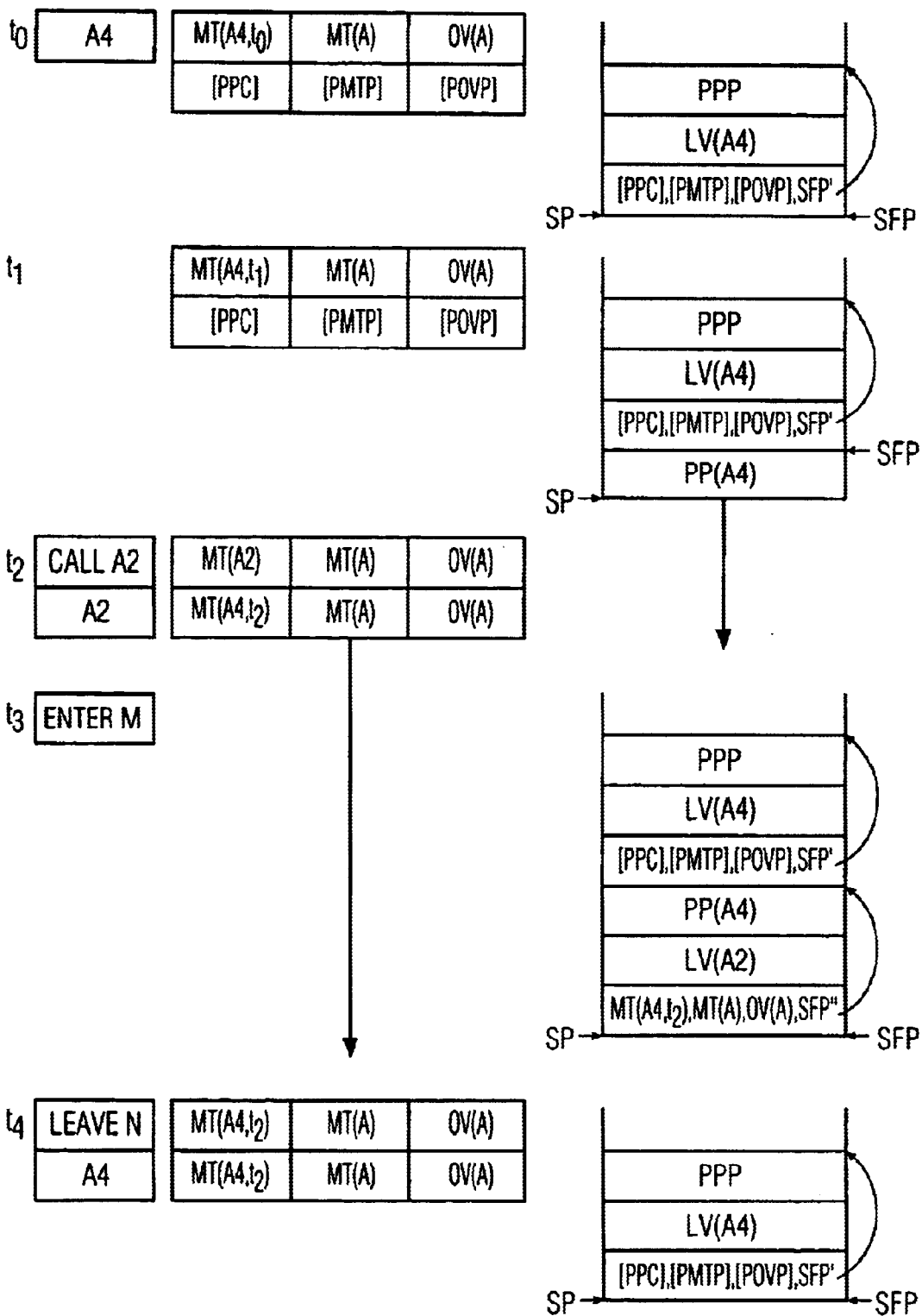
FIGS. 2–5 are diagrams illustrating operation of the system of FIG. 1 in accordance with embodiments of the invention.

FIG. 2 illustrates an exemplary sequence of operations of the processor during successive periods of time. The figure is organized in three columns with the first column indicating the operation momentarily being performed by the processor, the second column indicating the momentary contents of the first and second groups of registers 121 and 122, and the third column indicting the momentary contents of the stack. Note that brackets are used to symbolize the contents of a register or other memory location. For example. [PC] represents the contents of the program counter register PC.

The sequence begins at a time $t_0$ when the processor is in the process of performing a method A4, which is the fourth method addressed in the method table for an object A. At this time:

Register OVP contains the base address OV(A) identifying that location in the memory 20 containing the object variables for object A.

Register MTP contains the base address MT(A) identifying that location in the memory 20 containing the method table for object A (method table A).

Register PC contains the address MT(A4,$t_0$) which identifies the location in the memory 20 containing the next instruction to be executed by the processor in performing method A4.

Register POVP contains the base address, [POVP], which identifies the location in the memory 20 containing the object variables for a previous object (assuming that the processor had previously been manipulating information relating to an object).

Register PMTP contains the base address [PMTP] identifying the location in the memory 20 containing the method table for the previous object.

Register PPC contains the address [PPC], which identifies the location in the memory 20 containing the next instruction to be executed by the processor for the previous method.

The base frame of the stack, which is identified by the stack frame pointer SFP and includes several adjacent memory addresses, contains:

[PPC], [PMTP], [POVP], and a stack frame pointer SFP' identifying the address of the previously-pushed stack frame;

any local variables LV(A4) which have been produced during the performance of method A4, e.g. a loop count produced while performing calculations; and any previously pushed parameters PPP which have been produced during the performance of a previous method, e.g. pointers to an object to be modified or a variable to be used by a subsequently-performed method.

At time $t_1$, the processor pushes parameters PP(A4), which were produced during method A4, into the stack by first decrementing the stack pointer SP in register 124 to a new value identifying the new bottom address of the stack and then storing these parameters at that address. It also begins performing the instruction at the address still contained in the program counter register PC, i.e. the address MT(A4,$t_0$), and increments register PC to identify the address of the next instruction to be executed, i.e. the address MT(A4,$t_1$).

At time $t_2$, while in the course of performing method A4, the processor encounters the Local CALL instruction CALL A2. Included in this instruction is a parameter MTI(A2) specifying an index into method table A for method A2. In executing this instruction, the processor:

copies the contents of the first register group 121 into the second register group 122;

uses the index specified in parameter MTI(A2) to calculate (in the arithmetic logic unit 16) the, address in the method table containing the starting address of method A2 and loads this address into the program counter register PC to initiate performance of method A2.

At time $t_3$, while in the course of performing method A2, the processor encounters the instruction ENTER M. In executing this instruction, the processor:

decrements the stack pointer SP to a new value to provide in the stack the amount of additional space indicated by the value M for variables that will be produced during the performance of method A2;

pushes below this additional space:
the contents of register group 122, i.e. MT(A4,$t_2$), MT(A), OV(A);
a stack frame pointer SFP" identifying the location of the previous stack frame for method A4;

reads the value from register 124 into register 125 as the new value of the stack frame pointer, SFP.

At time $t_4$, after completing method A2, the processor encounters the instruction LEAVE N. In executing this instruction, the processor:

pops the contents of the bottom frame out of the stack, transferring MT(A4,$t_2$), MT(A), OV(A), and SFP" into the registers PC, MTP, OVP, and 125, respectively;

increments the stack pointer SP (in register 124) by the value N to the new bottom address of the stack.

The processor restarts method A4 by beginning performance of the instruction at the address MT(A4,$t_2$), which is once again in the program counter register PC.

Figure 3:
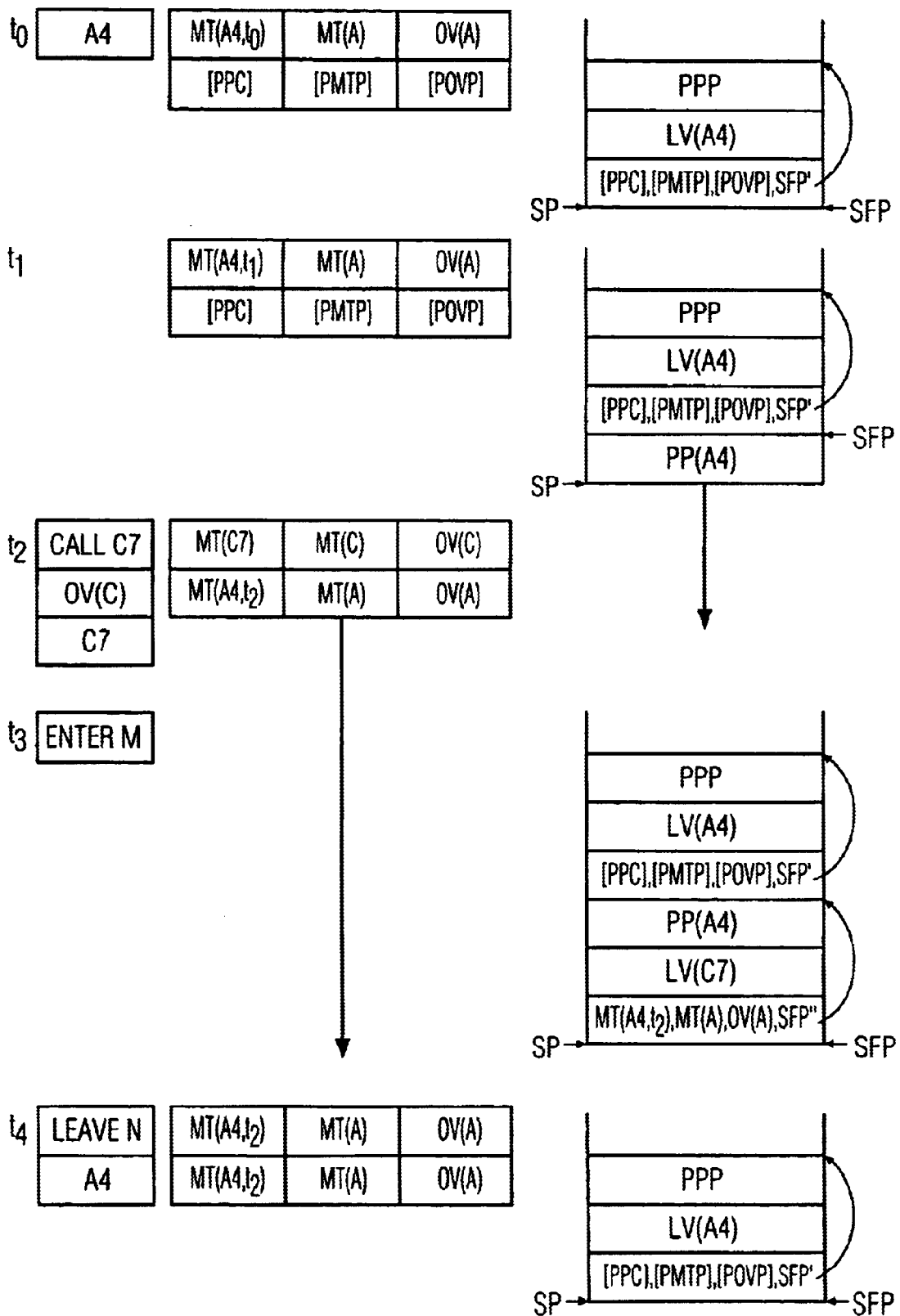

FIG. 3 is similar to FIG. 2, but illustrates an exemplary sequence of events which occur during processing of a Non-Local Call. In this case, the events at times $t_0$ and $t_1$ are identical to those in FIG. 2. However, at time $t_2$, rather than encountering the Local CALL to method A2 (in method table A) the processor encounters a Non-Local CALL to a method C7 (in method table C). Typically, different method tables are provided for different types of methods related to dissimilar classes of objects. For example, method table A could be used for methods related to FIFO functions, while method table C could be used for methods related to Direct Memory Access (DMA) functions.

Referring to FIG. 3, at time $t_2$, while in the course of performing method A4, the processor encounters the Non-Local CALL instruction CALL C7. Included in this instruction is a link to the base memory address containing object variables for the object C and a parameter MTI(C7) specifying the index into method table C for method C7. The link could be the actual pointer OV(C) to the base address for C's object variables or an index into the memory which contains OV(C). In this example the instruction includes the pointer OV(C) itself. In executing this Non-Local CALL instruction, the processor:

copies the contents of the first register group 121 into the second register group 122;

reads the pointer OV(C) into register OVP;

reads the method table pointer MT(C) from memory address OV(C)-2 and into register MTP;

uses the index specified in parameter MTI(C7) to calculate (in the arithmetic logic unit 16) the address in the method table containing the starting address of method C7 and loads this address into the program counter register PC to initiate performance of method C7.

Then the sequence is the same as that described for FIG. 2. Specifically, at time $t_3$, while in the course of performing method C7, the processor encounters the instruction ENTER M. In executing this instruction, the processor:

decrements the stack pointer SP to a new value to provide in the stack the amount of additional space indicated by the value M;

pushes below this additional space:
the contents of register group 122, i.e. MT(A4,$t_2$), MT(A), OV(A);
a stack frame pointer SFP" identifying the location of the previous stack frame for method A4;

reads the value from register 124 into register 125 as the new value of the stack frame pointer SFP.

At time $t_4$, after completing method C7, the processor encounters the instruction LEAVE N. In executing this instruction, the processor:

pops the contents of the bottom frame out of the stack, transferring MT(A4,$t_2$), MT(A), OV(A), and SFP" into the registers PC, MTP, OVP, and 125, respectively;

increments the stack pointer SP (in register 124) by the value N to the new bottom address of the stack.

The processor restarts method A4 by beginning performance of the instruction at the address MT(A4,$t_2$), which is once again in the program counter register PC.

Note that the Local CALL instruction uses a smaller code size and fewer instructions than the Non-Local CALL instruction. Thus, by providing both of these instructions, rather than a single CALL instruction, the efficiency and speed of operation is significantly increased whenever the processor changes from one method to another in the same method table.

Figure 4:
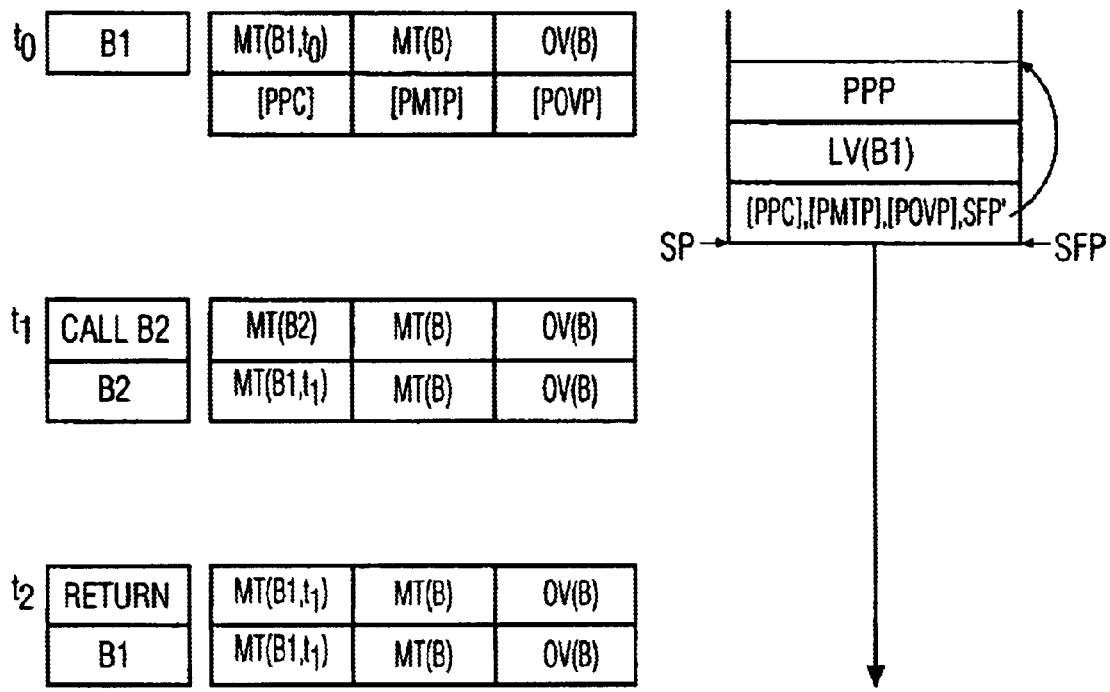

FIG. 4 illustrates processing of one of the simplest instructions in accordance with the invention, i.e. a Local CALL with no transfer of variables or parameters into or out of the stack. In this example, no pushed parameters for the method currently being performed (i.e. method B1) or local variables for the method called (i.e. method B2) are produced.

At time $t_0$, when the processor is in the process of performing the method B1:

Register OVP contains the base address OV(B) identifying that location in the memory 20 containing the object variables for an object B.

Register MTP contains the base address MT(B) identifying that location in the memory 20 containing the method table for object B (method table B).

Register PC contains the address MT(B1,$t_0$) which identifies the location in the memory 20 containing the next instruction to be executed by the processor in performing method B1.

Register POVP contains the base address [POVP], which identifies the location in the memory 20 containing the object variables for a previous object (assuming that the processor had previously been manipulating information relating to an object).

Register PMTP contains the base address [PMTP] identifying the location in the memory 20 containing the method table for the previous object.

Register PPC contains the address [PPC], which identifies the location in the memory 20 containing the next instruction to be executed by the processor for the previous method.

The base frame of the stack contains:

[PPC], [PMTP], [POVP], and a stack frame pointer SFP' identifying the address of the previously-pushed stack frame;

any local variables LV(B1) which have been produced during the performance of method B1; and any previously pushed parameters PPP which have been produced during the performance of a previous method.

At time $t_1$, while in the course of performing method B1, the processor encounters the Local CALL instruction CALL B2. Included in this instruction is a parameter MTI(B2) specifying an index into method table B for method B2. In executing this instruction, the processor:

copies the contents of the first register group 121 into the second register group 122;

uses the index specified in parameter MTI(B2) to calculate (in the arithmetic logic unit 16) the address in the method table containing the starting address of method B2 and loads this address into the program counter register PC to initiate performance of method B2.

At time $t_2$, after completing method B2, the processor encounters the RETURN instruction. In executing this instruction, the processor:

reads the contents of the registers PPC, PMTP, POVP into the registers PC, MTP, OVP, respectively;

restarts method B1 by beginning performance of the instruction at the address MT(B1,$t_1$), which is once again in the program counter register PC.

Figure 5:
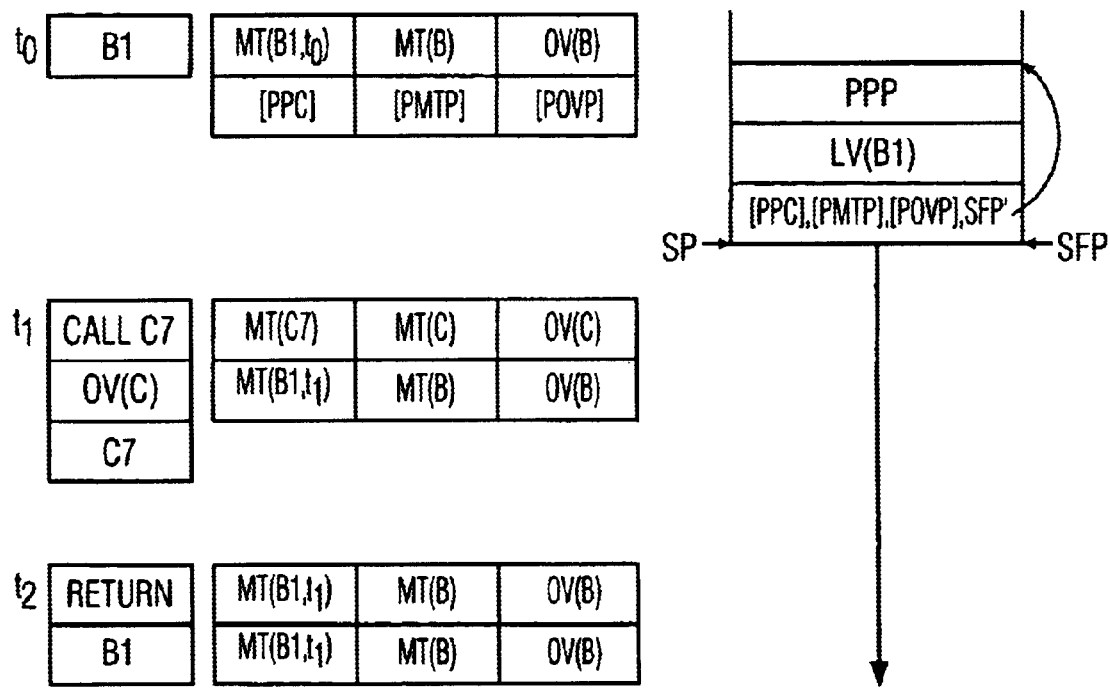

FIG. 5 illustrates processing of a Non-Local CALL with no transfer of variables or parameters into or out of the stack. In this example, no pushed parameters for the method currently being performed (i.e. method B1) or local variables for the method called (i.e. method C7) are produced.

At time $t_0$, when the processor is in the process of performing the method B1:

Register OVP contains the base address OV(B) identifying that location in the memory 20 containing the object variables for an object B.

Register MTP contains the base address MT(B) identifying that location in the memory 20 containing the method table for object B (method table B).

Register PC contains the address MT(B1,$t_0$) which identifies the location in the memory 20 containing the next instruction to be executed by the processor in performing method B1.

Register POVP contains the base address [POVP], which identifies the location in the memory 20 containing the object variables for a previous object (assuming that the processor had previously been manipulating information relating to an object).

Register PMTP contains, the base address [PMTP] identifying the location in the memory 20 containing the method table for the previous object.

Register PPC contains the address [PPC], which identifies the location in the memory 20 containing the next instruction to be executed by the processor for the previous method.

The base frame of the stack contains:

[PPC], [PMTP], [POVP], and a stack frame pointer SFP' identifying the address of the previously-pushed stack frame;

any local variables LV(B1) which have been produced during the performance of method B1; and any previously pushed parameters PPP which have been produced during the performance of a previous method.

At time $t_1$, while in the course of performing method B1, the processor encounters the Non-Local CALL instruction CALL C7. Included in this instruction is a parameter MTI (C7) specifying an index into method table C for method C7. In executing this instruction, the processor:

copies the contents of the first register group 121 into the second register group 122;

reads the pointer OV(C) into register OVP;

reads the method table pointer MT(C) from memory address OV(C)-2 and into register MTP;

uses the index specified in parameter MTI(C7) to calculate (in the arithmetic logic unit 16) the address in the method table containing the starting address of method C7 and loads this address into the program counter register PC to initiate performance of method C7.

At time $t_2$, after completing method B2, the processor encounters the RETURN instruction. In executing this instruction, the processor:

reads the contents of the registers PPC, PMTP, POVP into the registers PC, MTP, OVP, respectively;

restarts method B1 by beginning performance of the instruction at the address $MT(B1,t_1)$, which is once again in the program counter register PC.

Figure 6:
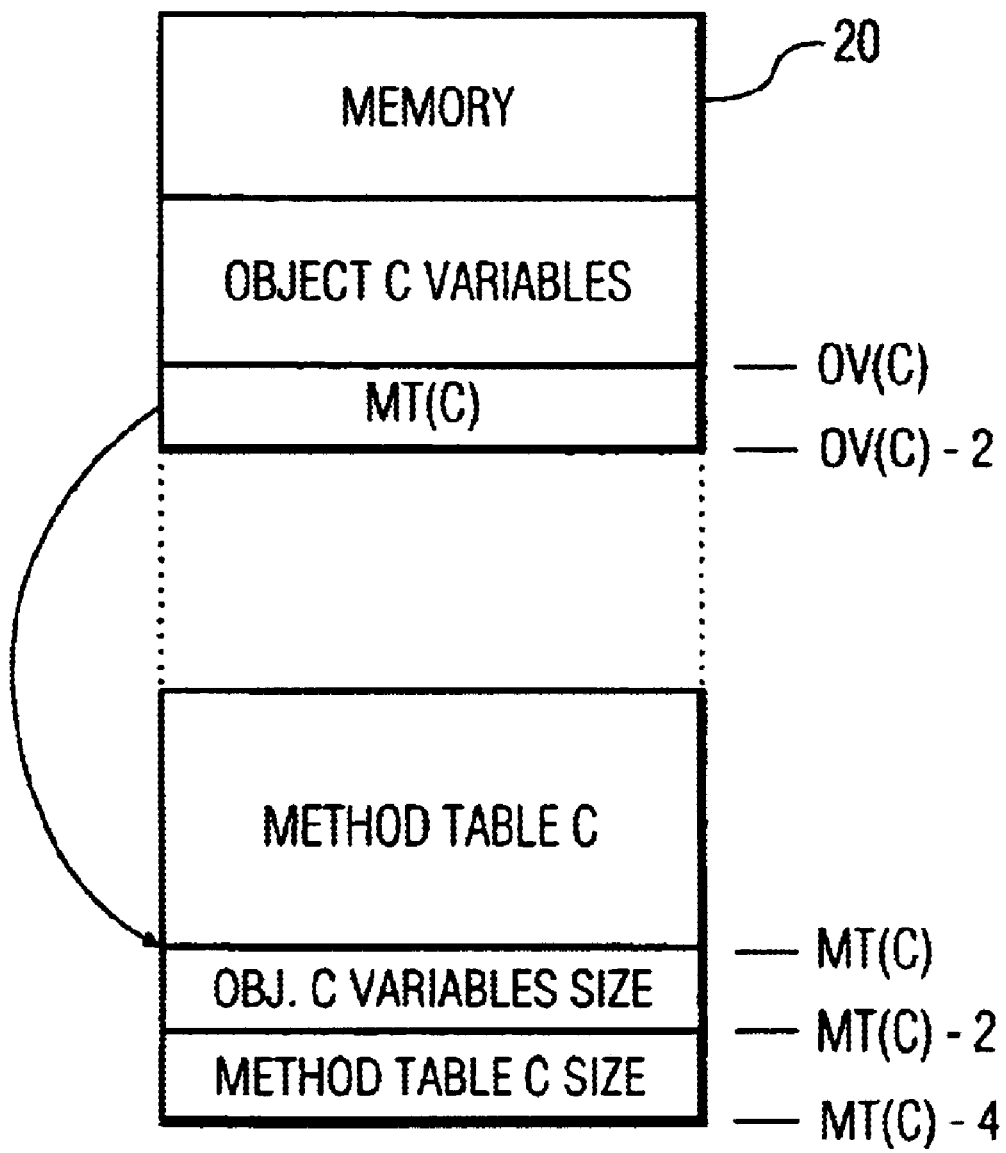
FIG. 6 is a block diagram illustrating part of a memory structured in accordance with an embodiment of the invention.

To facilitate performance of the different methods, preferably the object variables for the current object and the method table for that object are stored in a quick-access memory, such as a cache memory, while they are in use. To speed the process of storing the object variables and method table for the current object in the cache memory, and to facilitate economic use of the storage space in the cache memory, information describing the sizes of the object's variables and method table are pre-stored in memory at predetermined locations relative to the base address of the respective method table. FIG. 6 shows an exemplary embodiment of this, where:

the information describing the size of an object's variables is stored at a location in the memory 20 having a base address MT-2;

the information describing the size of the object's method table is stored at a location in the memory 20 having a base address MT-4.

In this embodiment, when the processor is instructed to perform a Non-Local CALL, it operates similarly to what has been generally described with reference to FIG. 3. More specifically, however, if the processor is utilizing a cache memory to hold the current object variables and/or method table, when a Non-Local CALL is received the respective size information is used to update the cache memory. Using, as an example, the CALL C7 instruction that is encountered at time $t_2$ in FIG. 3, in this embodiment the link included in the instruction will also be to the base address OV(C) in the memory 20. Now, however, the processor operates with the inherent knowledge that OV(C)-2, MT(C)-2, and, MT(C)-4, are the addresses in the memory 20 containing the method table pointer MT(C), the size of the object C variables, and the size of the object C method table. In executing the CALL C7 instruction, the processor:

reads the pointer OV(C) into register OVP;

reads the method table pointer MT(C) from memory location OV(C)-2 and into register MTP;

reads the size information from memory locations MT(C)-2 and MT(C)-4 into the cache memory;

uses the index specified in the parameter MTI(C7), included in the CALL C7 instruction, to calculate the address in the method table containing the starting address of method C7 and loads this address into the program counter register PC to initiate performance of method C7;

reads the object C variables and method table from the respective memory 20 locations (now specified in registers OVP and MTP) and into the cache memory.

Note that any or all of the registers in the context register set may comprise dedicated memory locations in a cache memory. The specific memory locations may be changed, e.g. to any locations designated by a cache manager in the processor, but are always known to the processor.

To further facilitate performance of the different methods, preferably coding information defining the methods located by the method table currently in use is also stored in a quick-access memory. To speed the process of storing this information and to facilitate economic use of space in the quick-access memory, size data representing the space needed for the coding information is stored in memory with the coding information, e.g. at the beginning address for each method, as identified by a respective method table.

What is claimed is:

1. A method of operating a processor to utilize variables and method tables for a plurality of objects, said method comprising:
   a. storing in memory at least one object variable for at least one of the plurality of objects;
   b. storing in memory at least one method table for the plurality of objects;
   c. providing a first dedicated memory for storing pointers locating in memory currently utilized ones of the at least one object variable and of the at least one method table;
   d. providing a second dedicated memory for storing pointers locating in memory previously utilized ones of the at least one object variable and of the at least one method table.

2. A method as in claim 1 where the first and second dedicated memories comprise respective first and second groups of dedicated registers.

3. A method as in claim 2 where the first and second groups of dedicated registers include, respectively, a current program counter register and a previous program counter register.

4. A method as in claim 1 where the processor utilizes a pointer stored in the first dedicated memory to read into a cache memory at least part of a method table located by said pointer.

5. A method as in claim 4 where the processor utilizes a pointer stored in the first dedicated memory to read into a cache memory at least part of an object variable located by said pointer.

6. A method as in claim 1 where the method table pointers are stored at predetermined locations.

7. A method as in claim 6 where the predetermined locations are linked to the locations of associated object variables.

8. A method as in claim 1 where size data representing space needed to store information comprising any object variables and a method table for a respective object is stored at a memory location linked to a memory location where information relating to said respective object is stored, the processor utilizing said size data to store said information in a quick-access memory.

9. A method as in claim 8 where the rapid-access memory comprises a cache memory.

10. A method as in claim 8 where the size data is stored at a memory location indexed off of the location where the method table for the respective object is stored.

11. A method as in claim 1 where size data representing space needed to store information defining methods located by the at least one method table is stored in memory with said information, said processor utilizing said size data to store said information in a quick-access memory.

12. A method as in claim 1 where the processor stops performance of a first method, for which respective object variables and method table pointers are contained in the first dedicated memory, to perform a second method by:
   a. reading said pointers from the first dedicated memory into the second dedicated memory;
   b. initiating performance of the second method.

13. A method as in claim 12 where, after stopping performance of the second method, the processor reinitiates performance of the first method by reading said pointers from the second dedicated memory into the first dedicated memory.

14. A method as in claim 12 where, after reading said pointers from the first dedicated memory into the second dedicated memory, the processor reads an object variables pointer and a method table pointer for the second method from respective memory locations into the first dedicated memory.

15. A method as in claim 14 where, after stopping performance of the second method, the processor reinitiates performance of the first method by reading said pointers from the second dedicated memory into the first dedicated memory.

16. A method as in claim 1 where the processor stops performance of a first method, for which respective object variables and method table pointers are contained in the first dedicated memory, to perform a second method by:

a. reading the pointers from the first dedicated memory into the second dedicated memory;

b. reading said pointers from the second dedicated memory into a third memory;

c. initiating performance of the second method.

17. A method as in claim 16 where, after stopping performance of the second method, the processor reinitiates performance of the first method by reading said pointers from the second dedicated memory into the first dedicated memory.

18. A method as in claim 16 where the third memory is addressable by means of a pointer.

19. A method as in claim 18 where the third memory comprises a LIFO stack.

20. A method as in claim 1 where the processor stops performance of a first method, for which respective object variables and method table pointers are contained in the first dedicated memory, to perform a second method by:

a. reading the pointers from the first dedicated memory into the second dedicated memory;

b. reading said pointers from the second dedicated memory into a third memory;

c. reading an object variables pointer and a method table pointer for the second method from respective memory locations into the first dedicated memory;

d. initiating performance of the second method.

21. A method as in claim 20 where, after stopping performance of the second method, the processor reinitiates performance of the first method by reading said pointers from the second dedicated memory into the first dedicated memory.

22. A method as in claim 20 where the third memory is addressable by means of a pointer.

23. A method as in claim 22 where the third memory comprises a LIFO stack.

\* \* \* \* \*